US008774847B2

(12) United States Patent
Virta et al.

(10) Patent No.: US 8,774,847 B2
(45) Date of Patent: Jul. 8, 2014

(54) CELLULAR RADIO PATH MEASUREMENT AND REPORTING

(75) Inventors: Henri Jani Ilari Virta, Turku (FI); Tommi Tapani Kangassuo, Salo (FI); Jukka Rikhard Ala-Kokko, Salo (FI)

(73) Assignee: Broadcom Corporation, Irvine, CA (US)

( * ) Notice: Subject to any disclaimer, the term of this patent is extended or adjusted under 35 U.S.C. 154(b) by 217 days.

(21) Appl. No.: 13/191,861

(22) Filed: Jul. 27, 2011

(65) Prior Publication Data

US 2013/0029707 A1    Jan. 31, 2013

(51) Int. Cl.
*H04B 15/00* (2006.01)
*H04B 17/00* (2006.01)

(52) U.S. Cl.
USPC ............... 455/502; 455/115.1; 455/115.3; 455/226.1; 455/226.2

(58) Field of Classification Search
USPC ............ 455/422.1, 435.2–442, 69, 126, 522, 455/10, 115.1, 115.3, 135, 226.1, 226.2, 455/13.2, 502
See application file for complete search history.

(56) References Cited

U.S. PATENT DOCUMENTS

| | | | | |
|---|---|---|---|---|
| 7,027,718 B1 * | 4/2006 | Ohishi et al. | ............... | 386/211 |
| 7,328,034 B2 * | 2/2008 | Costa et al. | .................... | 455/502 |
| 7,340,260 B2 * | 3/2008 | McAlexander | ............ | 455/456.1 |
| 7,729,693 B2 * | 6/2010 | Delaveau et al. | ............. | 455/424 |
| 7,990,883 B2 * | 8/2011 | Nishikawa | .................... | 370/252 |
| 8,031,692 B2 * | 10/2011 | Jeong et al. | ................... | 370/350 |
| 2004/0171402 A1 * | 9/2004 | Tamaki et al. | ................ | 455/522 |
| 2004/0203782 A1 * | 10/2004 | Peng et al. | .................... | 455/436 |
| 2005/0233704 A1 * | 10/2005 | Maekawa | ........................ | 455/69 |
| 2005/0254589 A1 * | 11/2005 | Higuchi et al. | ................ | 375/260 |
| 2006/0078070 A1 * | 4/2006 | Zhidkov et al. | ............... | 375/326 |
| 2006/0234738 A1 * | 10/2006 | Costa et al. | .................... | 455/502 |
| 2007/0076662 A1 | 4/2007 | Jain et al. | | |
| 2007/0159969 A1 * | 7/2007 | Das et al. | ....................... | 370/229 |
| 2007/0165728 A1 * | 7/2007 | Parizhsky et al. | ............. | 375/260 |
| 2008/0069062 A1 * | 3/2008 | Li et al. | .......................... | 370/338 |
| 2008/0084849 A1 * | 4/2008 | Wang et al. | .................... | 370/332 |
| 2008/0225796 A1 | 9/2008 | Malladi et al. | | |
| 2008/0227448 A1 | 9/2008 | Kim et al. | | |
| 2009/0028112 A1 * | 1/2009 | Attar et al. | ..................... | 370/332 |
| 2009/0122810 A9 * | 5/2009 | Jin et al. | ......................... | 370/468 |
| 2009/0143065 A1 * | 6/2009 | Mattila | ........................ | 455/423 |
| 2010/0208720 A1 * | 8/2010 | Fujishima et al. | ............. | 370/350 |
| 2010/0248735 A1 * | 9/2010 | Hamabe et al. | ............ | 455/452.2 |

(Continued)

FOREIGN PATENT DOCUMENTS

| | | |
|---|---|---|
| EP | 2 048 829 A1 | 4/2009 |
| WO | WO 2008/116027 A2 | 9/2008 |
| WO | WO 2011/05044 A1 | 5/2011 |

*Primary Examiner* — Dominic E Rego
(74) *Attorney, Agent, or Firm* — Stanton IP Law (57) ABSTRACT

There are provided measures for cellular radio path measurement and reporting. Such measures may exemplarily include, by a terminal, initiating transmission of a beacon signal of the terminal towards base stations in a coverage area of which the terminal resides, and, by a base station, monitoring transmission of the beacon signal from the terminal, measuring characteristics of a radio path towards the terminal based on a received beacon signal from the terminal, determining a timing value of the received beacon signal from the terminal, and initiating storage of the measured characteristics and the determined timing value as data with respect to the terminal in a network-based database being common for base stations in a coverage area of which the terminal resides.

15 Claims, 6 Drawing Sheets

(56) References Cited

U.S. PATENT DOCUMENTS

| | | | |
|---|---|---|---|
| 2010/0260155 A1* | 10/2010 | Grilli et al. | 370/336 |
| 2010/0278034 A9* | 11/2010 | Laroia et al. | 370/209 |
| 2010/0296594 A1* | 11/2010 | Ko et al. | 375/260 |
| 2010/0317343 A1* | 12/2010 | Krishnamurthy et al. | 455/435.1 |
| 2011/0058529 A1* | 3/2011 | Uemura | 370/331 |
| 2011/0080896 A1 | 4/2011 | Krishnamurthy et al. | |
| 2012/0163305 A1* | 6/2012 | Nimbalker et al. | 370/329 |
| 2012/0165037 A1* | 6/2012 | Bull et al. | 455/456.1 |

* cited by examiner

CELLULAR RADIO PATH MEASUREMENT AND REPORTING

FIELD OF THE INVENTION

The present invention relates to cellular radio path measurement and reporting. More specifically, the present invention relates to measures (including methods, apparatuses and computer program products) for cellular radio path measurement and reporting.

BACKGROUND

In the field of mobile communication systems, particularly cellular communication systems, one issue relates to radio path measurement and reporting, specifically neighbor measurement and reporting.

Conventionally, a terminal, such as a UE, performs measurements with respect to its serving base station and neighbor base stations thereof, i.e. all base station in the coverage area or cell of which the terminal resides, and reports the results to the network, i.e. a network entity such as a RNC or the like. The network can give the terminal information about what to measure, or the terminal may blindly (i.e. without any directives from the network) search and measure the neighbor base stations.

Such measurements typically relate to characteristics of the radio path (air interface) between the terminal and the respective base station, including e.g. quality and propagation measures.

The network can use the measurement reports from the terminal for decision making relating to mobility, for example in handover decisions. Also, the network can use the measurement reports to monitor and optimize transmission quality between the terminal and the respective base station. The terminal can use the measured results for similar decision making, for example in selecting the most suitable base station for an autonomous cell reselection or the like.

Such conventional measurement and reporting consumes network capacity from the radio path (air interface) for transmitting measurement reports from the terminal to the network, and increases terminal power usage for performing measurements and transmitting measurement reports. Further, the transmission of measurement reports can utilize certain signaling channels that are not always available or may be degraded in terms of transmission capacity. This may cause that the terminal has to wait until the signaling channel is available again before being able to transmit measurement reports, or that the amount of measurement results being capable of being transmitted in one measurement report, thereby resulting in latency or delay in transmission and in potential usage of the measurement results.

In case of cell change (i.e. handover), the terminal needs to obtain synchronization before the terminal can receive or transmit data. In particular, the terminal needs to obtain uplink synchronization (which can be done for example via random access procedure execution) before the terminal can transmit measurement reports to the network. However, obtaining uplink synchronization takes some time after cell change (i.e. handover), thereby resulting in latency or delay in transmission and in potential usage of the measurement results, and consumes terminal power, thereby resulting in a reduced battery lifetime of the terminal.

In view thereof, there exist problems in terms of resource and power consumption as well as latency or delay in the context of cellular radio path measurement and reporting.

Thus, there is a need to further improve cellular radio path measurement and reporting.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising monitoring transmission of a beacon signal from a terminal, measuring characteristics of a radio path towards the terminal based on a received beacon signal from the terminal, determining a timing value of the received beacon signal from the terminal, and initiating storage of the measured characteristics and the determined timing value as data with respect to the terminal in a network-based database being common for base stations in a coverage area of which the terminal resides.

According to an exemplary aspect of the present invention, there is provided a method comprising initiating transmission of a beacon signal of a terminal towards base stations in a coverage area of which the terminal resides, and receiving a result of measurements relating to at least one of a radio path and a timing between the terminal and one or more of said base stations from a base station currently serving the terminal.

According to an exemplary aspect of the present invention, there is provided an apparatus comprising at least one processor, at least one memory including computer program code, and at least one interface configured for communication with at least another apparatus. The at least one processor, with the at least one memory and the computer program code, being configured to cause the apparatus to perform: monitoring transmission of a beacon signal from a terminal, measuring characteristics of a radio path towards the terminal based on a received beacon signal from the terminal, determining a timing value of the received beacon signal from the terminal, and initiating storage of the measured characteristics and the determined timing value as data with respect to the terminal in a network-based database being common for base stations in a coverage area of which the terminal resides.

According to an exemplary aspect of the present invention, there is provided an apparatus comprising at least one processor, at least one memory including computer program code, and at least one interface configured for communication with at least another apparatus. The at least one processor, with the at least one memory and the computer program code, being configured to cause the apparatus to perform: initiating transmission of a beacon signal of a terminal towards base stations in a coverage area of which the terminal resides, and receiving a result of measurements relating to at least one of a radio path and a timing between the terminal and one or more of said base stations from a base station currently serving the terminal.

According to an exemplary aspect of the present invention, there is provided a computer program product comprising computer-executable computer program code which, when the program is run on a computer, is configured to cause the computer (e.g. a computer of an apparatus according to any one of the aforementioned apparatus-related aspects) to carry out the method according to any one of the aforementioned method-related aspects.

Further developments and/or modifications of the aforementioned aspects of the present invention, which are conceivable according to exemplary embodiments of the present invention, are derivable from the subsequent description.

By way of exemplary embodiments of the present invention, there is provided feasibility of advanced cellular radio path measurement and reporting. More specifically, by way of exemplary embodiments of the present invention, there are provided measures and mechanisms for advanced cellular radio path measurement and reporting.

Thus, improvement is achieved by methods, devices and computer program products enabling advanced cellular radio path measurement and reporting.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following exemplary description mainly refers to specifications being used as non-limiting examples for certain exemplary network configurations and deployments. In particular, for the applicability of thus described exemplary aspects and embodiments, LTE- (including LTE-Advanced-) related cellular communication networks are used as non-limiting examples. As such, the description of exemplary aspects and embodiments given herein specifically refers to terminology which is directly related thereto. Such terminology is only used in the context of the presented non-limiting examples, and does naturally not limit the invention in any way. Rather, any other communication systems, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for cellular radio path measurement and reporting.

In the following, exemplary embodiments of the present invention are described with reference to methods, procedures and functions, as well as with reference to structural arrangements and configurations.

Figure 1:
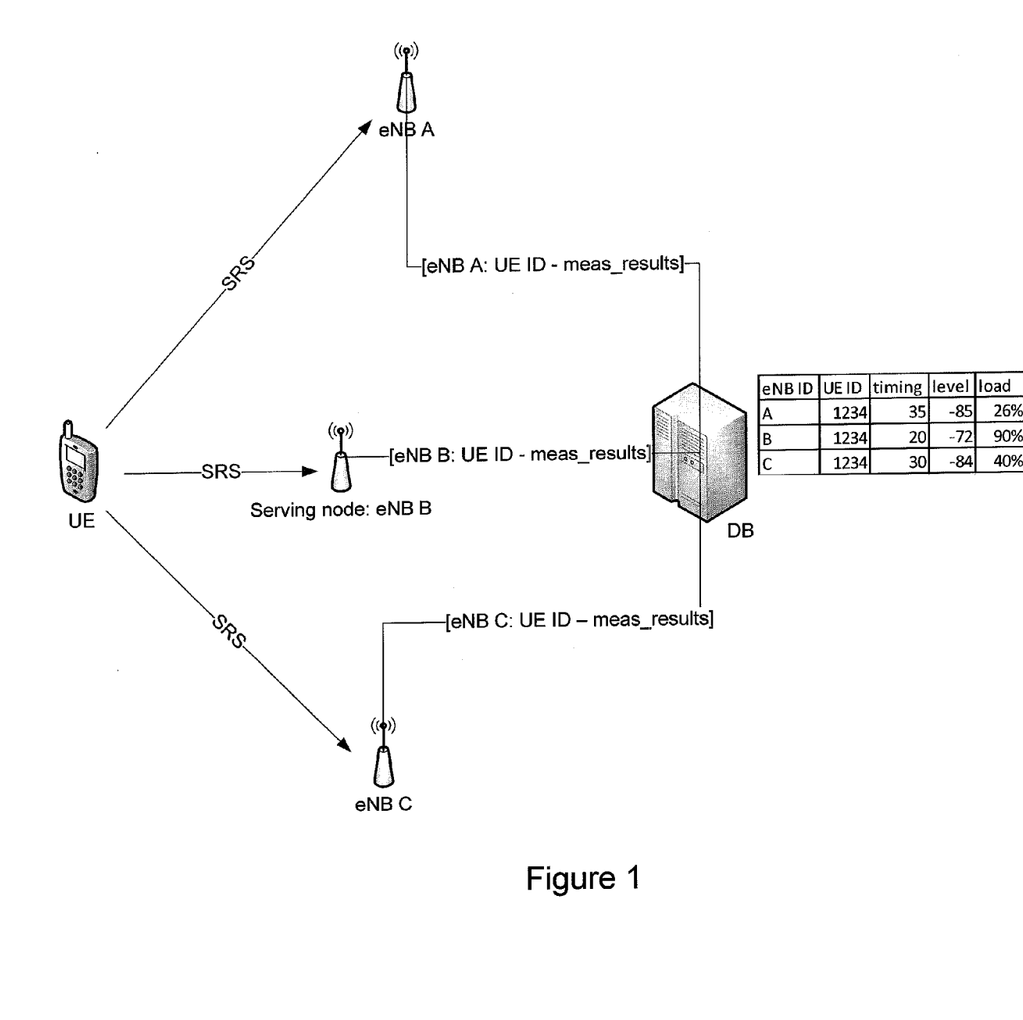
FIG. 1 shows a schematic diagram illustrating a system-related overview relating to beacon signal transmission and data storage according to exemplary embodiments of the present invention.

FIG. 1 shows a schematic diagram illustrating a system-related overview relating to beacon signal transmission and data storage according to exemplary embodiments of the present invention.

As shown in FIG. 1, an exemplary system configuration according to exemplary embodiments of the present invention comprises a terminal UE, three base stations eNB A, eNB B and eNB C, in the coverage area or cell of which the terminal UE resides, while base station eNB B is assumed to be the serving base station of the UE, and a database DB representing a network-based database such as a central data storage which may be implemented at any network entity such as a RNC or the like. It is noted that the present invention and embodiments thereof are not limited to such exemplary system configuration.

In the exemplary system configuration of FIG. 1, the terminal UE sends a beacon signal denoted by SRS to the base stations which monitor the UE-transmitted beacon signal. Upon receipt of the beacon signal, a respective base station performs measurements and/or determinations relating to the radio path and/or timing properties and the like, and stores the measurement and/or determination results with respect to the terminal UE in the network-based database. In FIG. 1, it is indicated that such results denoted as "meas_results" for the terminal UE with identifier UE ID are provided by each respective base station eNB x (x=A, B, C) to the DB. In the DB, the measurement and/or determination results from all of the base stations relevant for the terminal UE are stored e.g. in a table. In the example according to FIG. 1, the measurement and/or determination results from the base stations comprise a level value indicating a quality characteristic of the respective radio path, a timing value indicating a timing difference between the received beacon signal and the timing of the respective base station, and a load value indicating a processing load at the respective base station. Such data could then be utilized by the network, e.g. the serving base station eNB B, for further processings as outlined below, such as e.g. decision making, control, calculation of an uplink timing, and the like. Based thereon, the network, e.g. the serving base station eNB B, can provide the terminal with corresponding information, data, results, commands, and the like.

According to exemplary embodiments of the present invention, the network utilizes a UE-transmitted beacon signal to determine characteristics (e.g. quality and propagation) of the radio path between the UE and specific base stations. To this end, the network has specific base stations constantly monitoring a specific frequency or channel where UE(s) are sending the beacon signal, wherein such specific base stations can be certain ones or all base stations of the network, which are correspondingly configured for monitoring purposes (and associated purposes described hereinafter). Separation of different UEs transmitting the beacon signal can be made by a UE identifier encoded in the beacon signal and/or a transmission code used for the beacon signal transmission.

For example, in LTE system, the network can utilize a UE-transmitted Sounding Reference Symbol (SRS) as beacon signal, and the UE can use a dedicated RNTI value for encoding the signal, i.e. for providing the UE identity by way of encoding to the beacon signal. Another example of a beacon signal, which is applicable to several network technologies, is to use a transmission burst sent in dedicated random access channel. In CDMA systems, transmissions are separated by the scrambling code (representing a transmission code) which is used to identify the UE. The UE identity can be a separately signaled RNTI value used for this purpose, or a C-RNTI value used also for other purposes like data transfer. In this regard, the network previously allocates unique RNTI values for each UE sending the beacon signal in this network environment. If a separate RNTI value for the beacon transmission is used, the UE identity can be provided to the UE for example in connection setup phase.

On the basis of the received beacon signal, each base station measures characteristics relating to its radio path to the UE, including e.g. the signal level, the quality, the delay of the beacon signal sent by the UE, or the like. Further, each base station determines a timing value of the received beacon signal, i.e. a timing difference between the received beacon signal and the timing of the base station as such.

The measurement results and timing from each base station are stored to the DB representing a centralized data storage.

The individual base stations can also determine and report additional information in the measurement reports, including for example those information which are not available from measurements done by the UE itself. Such additional information can be for example comprise processing load information of the respective base station, which the UE can then eventually utilize for mobility decisions or the like. Such additional information could also be stored in the DB with respect to the UE, as indicated in the column denoted "load" in FIG. 1.

From the collected results, namely the data of measurement results and timing from different base stations, the UE's serving base station can for example utilize these results for making handover decisions, initiating and/or executing handover procedures, controlling measurement and/or reporting requirements (e.g. adjusting the need for measurements to be performed by the UE), reporting the reading results to the UE, and adjusting the reading results to be reported to the UE. Such utilization results, possibly in connection with corresponding measurement results and the like, when being reported/sent to the UE, can be utilized by the UE accordingly. For example, the making of (autonomous) reselection decisions could be made by the UE in consideration of certain adjustments of the reported results at the network side, for example in that measurement results from heavily loaded base stations are not reported.

In view of the above, the network according to exemplary embodiments of the present invention comprises means of gathering the measured and determined results from the base stations monitoring the UE-transmitted beacon signal, and utilizing the results for controlling purposes, e.g. for controlling the measurements and reporting done by UE, the reporting done by the network towards the UE, mobility decisions, and providing uplink timing between the UE and the base stations. For example, by collecting the results to a centralized data storage, where measurements between one UE and one or several base stations are stored, the network can utilize these measurements accordingly.

Figure 2:
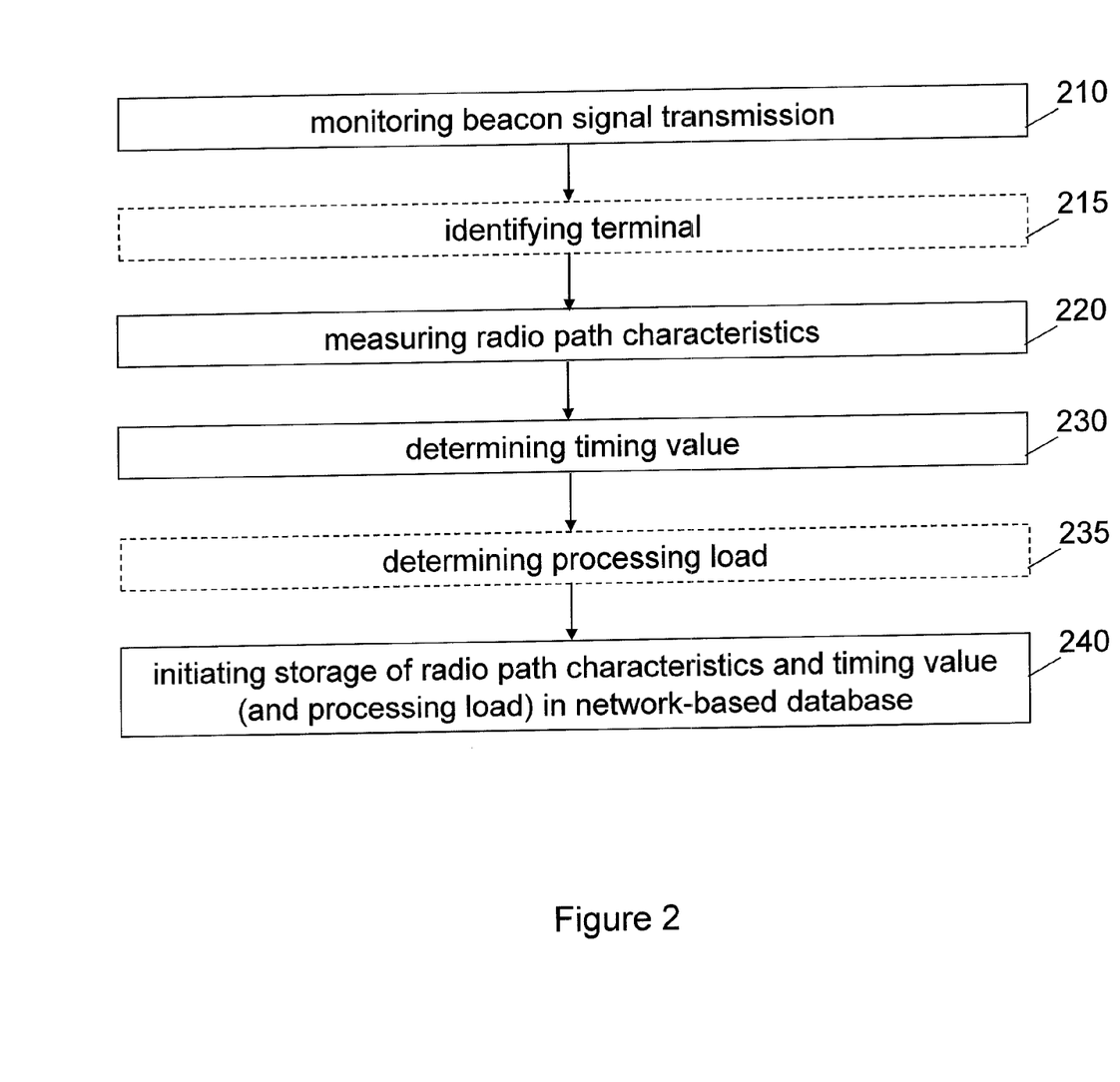
FIG. 2 shows a flowchart illustrating an example of a network-sided procedure according to exemplary embodiments of the present invention.

FIG. 2 shows a flowchart illustrating an example of a network-sided procedure according to exemplary embodiments of the present invention. The method of FIG. 2 is operable at or by a base station (or access node) of a cellular communication system, e.g. by an eNB of a LTE system or the like, such as any one of base stations eNB A, eNB B and eNB C according to FIG. 1.

As shown in FIG. 2 (by way of solid line boxes), a method according to exemplary embodiments of the present invention comprises an operation of monitoring (210) transmission of a beacon signal from a terminal, an operation of measuring (220) characteristics of a radio path (from the base station carrying out the method) towards the terminal based on a received beacon signal from the terminal, an operation of determining (230) a timing value of the received beacon signal from the terminal, and an operation of initiating (240) storage of the measured characteristics and the determined timing value as data with respect to the terminal in a network-based database being common for base stations in a coverage area of which the terminal resides.

As shown in FIG. 2 (by way of dashed line boxes indicating optional operations), a method according to exemplary embodiments of the present invention may also comprise an operation of identifying (215) identifying the terminal, wherein one of a terminal identifier encoded in the received beacon signal and a transmission code used for the beacon signal transmission may be used, and/or an operation of determining (235) a processing load, wherein in such case the storage initiation operation (240) also comprises initiating storage of the determined processing load as (additional) data with respect to the terminal in the network-based database.

Figure 3:
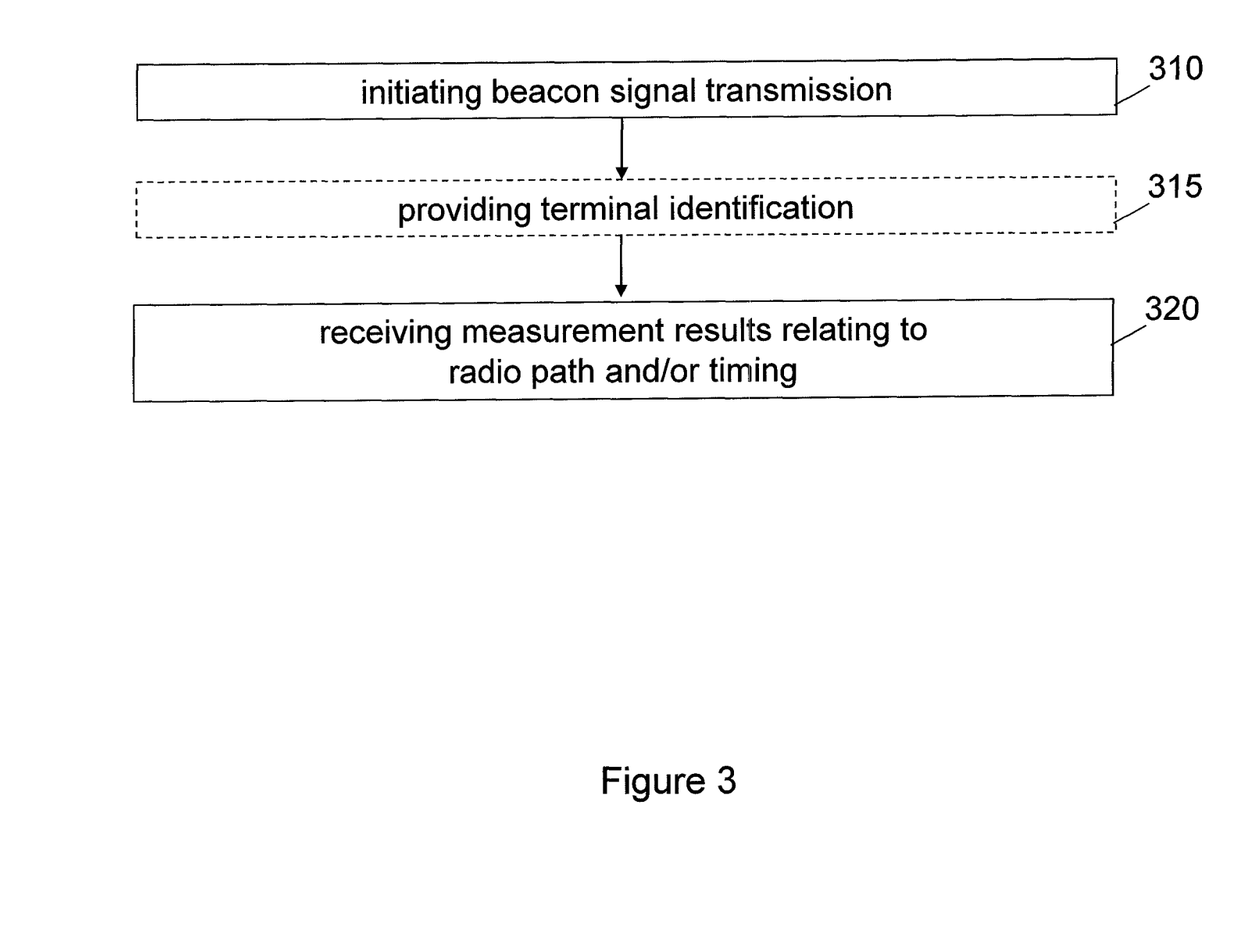
FIG. 3 shows a flowchart illustrating an example of a terminal-sided procedure according to exemplary embodiments of the present invention.

FIG. 3 shows a flowchart illustrating an example of a terminal-sided procedure according to exemplary embodiments of the present invention. The method of FIG. 3 is operable at or by a terminal (or user equipment) configured for operation in a cellular communication system, e.g. by a UE of a LTE system or the like, such as the terminal UE according to FIG. 1.

As shown in FIG. 3 (by way of solid line boxes), a method according to exemplary embodiments of the present invention comprises an operation of initiating (310) transmission of a beacon signal of a terminal towards base stations in a coverage area of which the terminal resides, and an operation of receiving (320) a result of measurements relating to at least one of a radio path and a timing between the terminal and one or more of said base stations from a base station currently serving the terminal.

As shown in FIG. 3 (by way of a dashed line box indicating an optional operation), a method according to exemplary embodiments of the present invention may also comprises an operation of providing (215) terminal identification, which may comprise one of encoding a terminal identifier in the beacon signal and using a transmission code for the beacon signal transmission.

Referring to FIGS. 2 and 3, it is noted that the sequence of the individual operations and the partitioning thereof as illustrated merely represents a non-limiting example only. Any other sequences of the individual operations and partitionings thereof, as conceivable by a skilled person, also fall within the scope of the present invention and exemplary embodiments thereof. For example, referring to the procedure of FIG. 2, the operation 215 may also be located after any one of operations 220, 230 and 235, the operation 235 may also be located before any one of operations 210, 215, 220 and 230. For example, referring to the procedure of FIG. 3, the operation 215 may be an integrated part of the operation 210.

Figure 4:
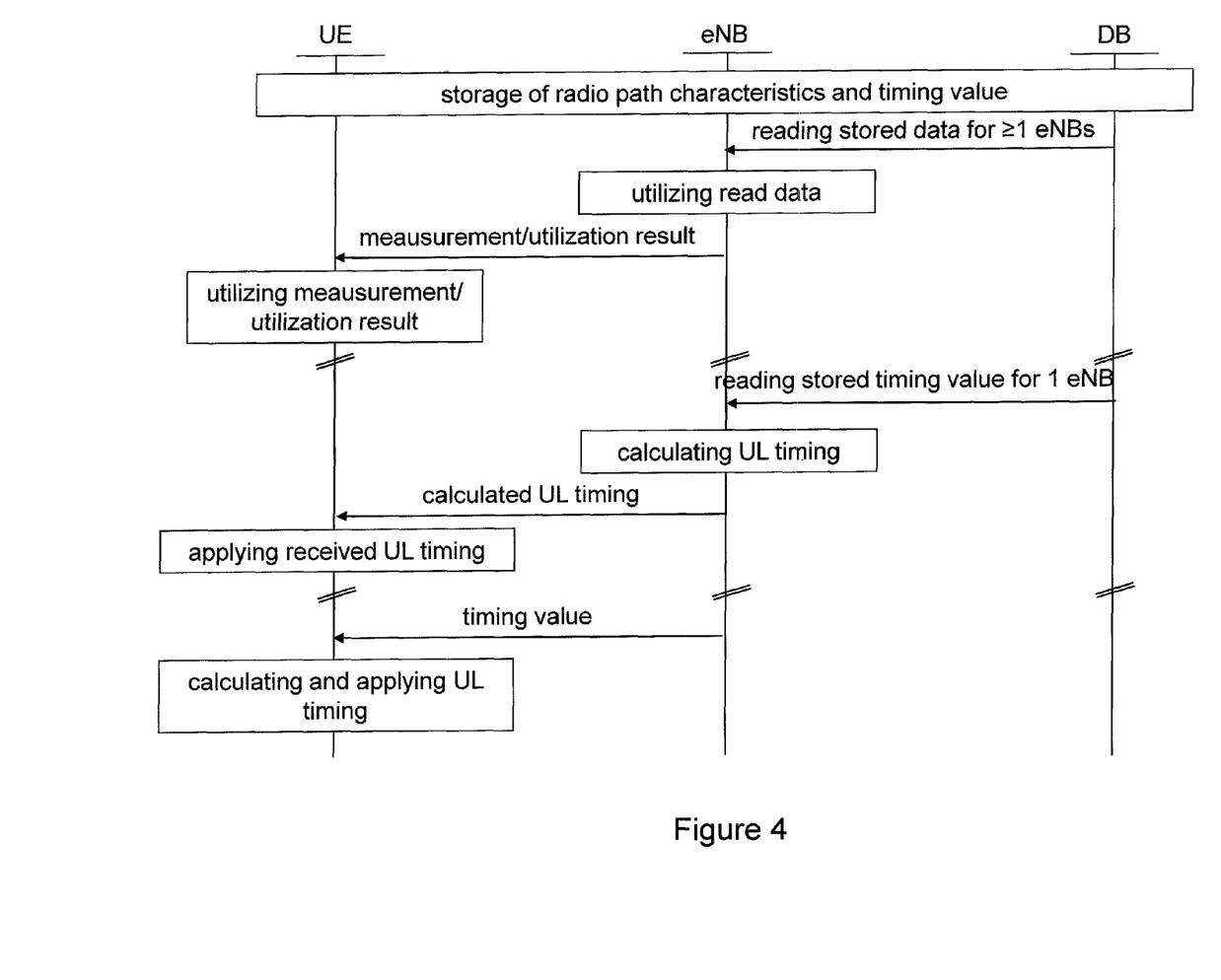
FIG. 4 shows a signaling diagram illustrating various procedures according to exemplary embodiments of the present invention.

FIG. 4 shows a signaling diagram illustrating various procedures according to exemplary embodiments of the present invention. Namely, three procedures are shown in FIG. 4 (being separated by small oblique double lines), which are mutually independent, and which thus could be carried out separately or in any conceivable combination. The illustration of these procedures in a single diagram is for the sake of convenience and by way of example only.

All of the procedures according to FIG. 4 assume that the aforementioned processes of beacon signal transmission and data storage are completed. That is, in short, the UE has sent its beacon signal, the eNB has performed respective measurements and/or determinations and has stored the resulting data in the DB (just like all the eNBs in the vicinity of the UE).

As shown in FIG. 4, in one procedure according to exemplary embodiments of the present invention, the eNB (e.g. the serving eNB) reads stored data (including radio path characteristics and timing value and, potentially, processing load) for one or more (other) eNBs (e.g. non-serving (target) eNBs) from the DB, and utilizes the thus read data accordingly. Then, the eNB sends or reports corresponding measurement reports (of its own and/or the eNB(s) for which the data has been read from the DB) and/or utilization reports (i.e. the results of utilization of respective data at the eNB) to the UE. The UE then utilizes the received measurement/utilization report(s) accordingly.

For example, based on radio path characteristics and timing values of other eNB(s), the eNB may make a handover decision for the UE, and the UE may utilize the reported result thereof for performing a corresponding handover, or the eNB may initiate and/or execute a handover procedure for the UE, and the UE may utilizer the reported result thereof for executing and/or completing a corresponding handover procedure, or the eNB may perform control of measurement and/or reporting requirements for the UE, and the UE may then utilize the reported control command thereof for performing measurement and/or reporting in accordance with the commanded measurement and/or reporting requirements. For example, based on processing loads of other eNB(s), the eNB may adjust the reading results to be reported to the UE, and the UE may then utilize the thus adjusted result reports for making a (autonomous) reselection decision.

As shown in FIG. 4, in one procedure according to exemplary embodiments of the present invention, the eNB (e.g. the serving eNB) reads stored data (in particular, a timing value) for one (other) eNB (e.g. non-serving (target) eNB) from the DB, and utilizes the thus read data for calculating an UL timing (UL TA) between the UE and the (other) eNB. For UL TA calculation, the eNB may consider the read timing value (or a difference of the read timing value and its own timing value) and a DL timing difference between the (other) eNB and its own. For details in this regard, reference is made to FIG. 5 below. Then, the calculated UL TA is reported from the eNB to the UE, and the UE then applies the reported UL TA accordingly.

As such UL TA calculation at the eNB is applicable when the network (i.e. the eNBs thereof) are synchronized, a corresponding indication of a synchronization of the network may also be reported to the UE, so that the UE knows that the provided uplink timing is based on a synchronized network and, thus, does not need to be further adjusted/corrected at the UE.

As shown in FIG. 4, in one procedure according to exemplary embodiments of the present invention, the eNB (e.g. the non-serving (target) eNB) reports its own timing value as previously determined (which could be locally available or be read from the DB) to the UE. Then, the UE calculates an UL timing (UL TA) between the UE and the eNB. For UL TA calculation, the UE may consider the received timing value and a DL timing difference between the eNB and its serving eNB. For details in this regard, reference is made to FIG. 5 below. Then, the UE applies the calculated UL TA accordingly.

As such UL TA calculation at the UE is applicable when the network (i.e. the eNBs thereof) are non-synchronized, a corresponding indication of a non-synchronization of the network may also be reported to the UE, so that the UE knows that the provided uplink timing is based on a non-synchronized network and, thus, needs to be further adjusted/corrected at the UE.

Figure 5:
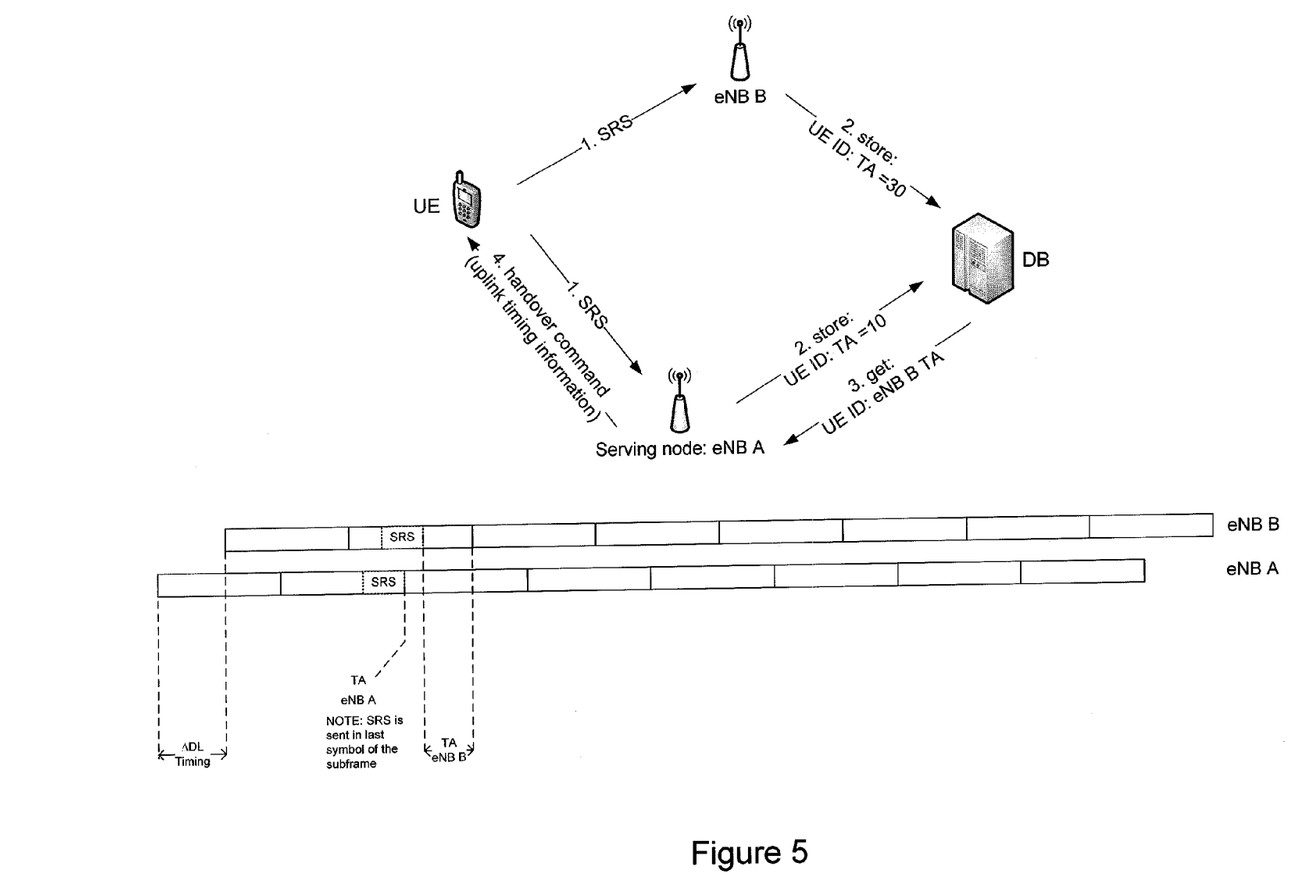
FIG. 5 shows a schematic diagram illustrating a system-related overview relating to uplink timing calculation according to exemplary embodiments of the present invention.

FIG. 5 shows a schematic diagram illustrating a system-related overview relating to uplink timing calculation according to exemplary embodiments of the present invention.

As shown in FIG. 5, an exemplary scenario according to exemplary embodiments of the present invention assumes that a serving base station eNB A and a non-serving (potential target) base station eNB B are linked with the UE in terms of monitoring and processing of the UE-transmitted beacon signal. After the timing values (TA) of both eNBs have been stored at the DB, the serving eNB A reads out the TA of the non-serving eNB B (with respect to the UE in question), utilizes eNB B's TA for UL TA calculation, utilizes the available data for making a handover decision, and issues a handover command including the thus calculated UL timing information to the UE.

Assuming that the network is synchronized, the network (e.g. eNB A) can calculate the uplink timing for the UE as follows.

In case the beacon signal is for example a random access burst sent from the UE, the timing is calculated based on a beacon signal sent without uplink timing on the serving base station. That is, if the UE sends the beacon signal without any timing advance (for example, by way of a random access burst), the uplink timing can be calculated directly from the beacon signal received at a respective base station.

In such case, the network (e.g. eNB A) can calculate the uplink timing for the UE based on the timing value of the eNB B, i.e. a measured delay in the transmission of the UE-transmitted beacon signal, and a DL timing difference between eNB B and eNB A. In view of the parameter denominations indicated in FIG. 5, this can be expressed as follows:

$UE\ TA(eNB\ B) = \Delta DL\text{Timing} - TA_{eNB\ B}$, wherein $DL\text{Timing} = eNB\ B(\text{timing}) - eNB\ A(\text{timing})$.

In case the beacon signal is for example a SRS sent from the UE, the timing is calculated based on a beacon signal sent with uplink timing on the serving base station. That is, if the UE sends the beacon signal with a timing advance, i.e. the beacon signal is sent based on the serving base station's uplink timing (for example, by way of a SRS), the uplink timing between the UE and a non-serving base station can be calculated with the knowledge of a timing between the UE and the serving base station, wherein the UE uplink timing for the serving base station can be read from the DB.

In such case, the network (e.g. eNB A) can calculate the uplink timing for the UE based on a difference between the timing values of eNB B and eNB A, i.e. the measured delays in the transmission of the UE-transmitted beacon signal or a difference between the serving cell and a target cell uplink timing advance, and a DL timing difference between eNB B and eNB A. In view of the parameter denominations indicated in FIG. 5, this can be expressed as follows:

$UE\ TA(eNB\ B) = \Delta DL\text{Timing} - \Delta TA$, wherein $\Delta TA = TA_{eNB\ B} - TA_{eNB\ A}$, and $DL\text{Timing} = eNB\ B(\text{timing}) - eNB\ A(\text{timing})$.

In view of the above, in order for base stations to be able to (reliably) calculate the uplink timing for the UE, the network base stations need to be synchronized to each other. As the possible time difference between the base stations is known, the network can calculate the uplink timing advance between the UE and the base stations in consideration thereof.

Assuming that the network is not synchronized, the uplink timing for the UE can only be (reliably) calculated at the UE.

In such case, the UE can calculate the uplink timing for the UE based on a timing difference between the serving base station and the other (non-serving) base station, i.e. DLTiming. When knowing that the given timing advance for the other base station (as provided by way of a corresponding report) is calculated from a non-synchronized network (e.g. by virtue of a corresponding indication, as indicated above), the UE knows that there is a need for adjustment/correction thereof. To this end, the UE may adjust/correct the given timing advance with the DL timing difference of the serving base station and the other base station, which is locally available at the UE (e.g. as a result of corresponding measurements).

In view of the above, the following effects can be achieved by exemplary embodiments of the present invention, for example. Further effects of exemplary embodiments of the present invention can be readily evident for a skilled person from the detailed description.

It is enabled that measurements relating to a radio path between a terminal and one or more base stations (such as those required for mobility decisions or the like) are effected at the network side, namely based on a terminal-transmitted beacon signal. Thereby, the measurements and reporting required from the terminal can be reduced or even eliminated, thus providing improvements in terms of resource consumption and terminal power consumption as well as latency or delay in the context of cellular radio path measurement and reporting.

It is enabled that an uplink timing between the UE and monitoring base stations are measured. Thereby, when such uplink timing is reported e.g. in connection with a handover command, a handover can be made without the need for separate uplink timing adjustment during the handover process. Accordingly, a faster handover procedure is enabled by way of a predetermined uplink timing.

It is enabled that a faster mobility (e.g. handover) decision is made on the network side, since required measurements are done by the network and latest measurement results are immediately available at the network (without the need of respective reports from the terminal).

It is enabled that less traffic is present on the radio path (i.e. the air interface), in particular when an existing beacon signal is used (such as SRS), as the terminal does not need to send measurement results to the network.

It is enabled that the network has available more information required for making certain decisions and/or performing certain controls. Thereby, the network can for example influence on reselection decisions by selecting the result(s) to be reported to the terminal. Thereby, the network is capable of adjusting load more efficiently, and the terminal is capable of making more intelligent (autonomous) reselection decisions with more informative measurement results reported from the network.

It is enabled that no further specifications are to be standardized for beacon signal transmission and terminal measurement rules.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description of respective corresponding methods and operations according to FIGS. 1 to 5.

Figure 6:
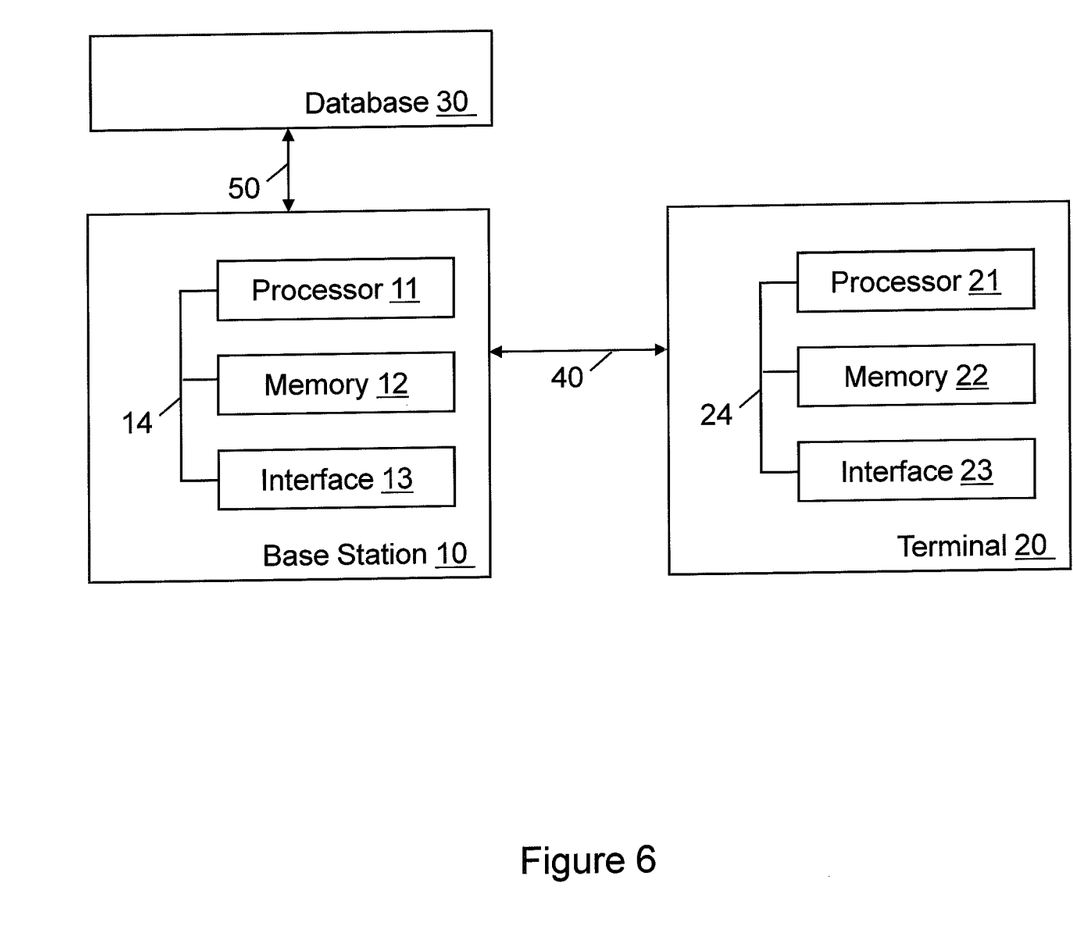
FIG. 6 shows a block diagram illustrating exemplary apparatuses according to exemplary embodiments of the present invention.

In FIG. 6 below, which is noted to represent a simplified block diagram, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a block diagram illustrating exemplary apparatuses according to exemplary embodiments of the present invention.

In view of the above, the thus described apparatuses 10, 20 and 30 are suitable for use in practicing the exemplary embodiments of the present invention, as described herein. The thus described apparatus 10 may represent a (part of a) network entity, i.e. base station or access node, such as for example a NodeB, an eNB, or the like, as described above, and may be configured to perform a procedure and/or exhibit a functionality as described in conjunction with any one of FIGS. 1, 2, 4 and 5. The thus described apparatus 20 may represent a (part of a) terminal or user equipment UE, as described above, and may be configured to perform a procedure and/or exhibit a functionality as described in conjunction with any one of FIGS. 1, 3, 4 and 5. The thus described apparatus 30 may represent a (part of a) network-based database or data storage, as described above, which may for example be located at a controller entity such as a RNC or the like, and may be configured to perform a procedure and/or exhibit a functionality as described in conjunction with any one of FIGS. 1, 4 and 5.

As shown in FIG. 6, according to exemplary embodiments of the present invention, a base station 10 comprises a processor 11, a memory 12, and an interface 13, which are connected by a bus 14 or the like, a terminal or user equipment 20 comprises a processor 21, a memory 22, and an interface 23, which are connected by a bus 24 or the like. The terminal or user equipment 20 may be connected with the base station 10 through a link or connection 40, and the base station 10 may be connected with the database 30 through a link or connection 50.

The memories 12 and 22 may store respective programs assumed to include program instructions or computer program code that, when executed by the associated processors 11 and 21, enable the respective electronic device or apparatus to operate in accordance with the exemplary embodiments of the present invention.

The processors 11 and 21 and/or the interfaces 13 and 23 may also include a modem or the like to facilitate communication over a (hardwire or wireless) link, respectively. The interfaces 13 and 23 may include a suitable transceiver coupled to one or more antennas or communication means for (hardwire or wireless) communications with the linked or connected device(s), respectively. The interfaces 13 and 23 are generally configured to communicate with another apparatus, i.e. the interface thereof. For example, the interface 13 of the network entity 10 may communicate with another network entity (not shown) storing the database 30.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] xxx" is construed to be equivalent to an expression such as "means for xxx-ing").

According to exemplary embodiments of the present invention, an apparatus representing the base station 10 comprises at least one processor 11, at least one memory 12 including computer program code, and at least one interface 13 configured for communication with at least another apparatus. The at least one processor 11, with the at least one memory 12 and the computer program code, is configured to cause the apparatus 10 to perform: monitoring transmission of a beacon signal from a terminal 20, measuring characteristics of a radio path towards the terminal 20 based on a received beacon signal from the terminal 20, determining a timing value of the received beacon signal from the terminal 20, and initiating storage of the measured characteristics and the determined timing value as data with respect to the terminal 20 in a network-based database 30.

According to exemplary embodiments of the present invention, the at least one processor 11, with the at least one memory 12 and the computer program code, may be further configured to cause the apparatus to perform: reading at least one of the stored data with respect to the terminal for one or more of said base stations from the network-based database, and utilizing the reading result for at least one of making a handover decision for the terminal, initiating and/or executing a handover procedure for the terminal, controlling measurement and/or reporting requirements for the terminal, reporting the reading results to the terminal, and adjusting the reading results to be reported to the terminal.

According to exemplary embodiments of the present invention, the at least one processor 11, with the at least one memory 12 and the computer program code, may be further configured to cause the apparatus to perform: reading a determined timing value with respect to the terminal for one of said base stations from the network-based database, calculating an uplink timing between the terminal and said one of said base stations based on the read timing value and a downlink timing difference between said one of said base stations and a base station currently serving the terminal, and reporting the calculated uplink timing together with an indication of a synchronization of the network to the terminal.

According to exemplary embodiments of the present invention, the at least one processor 11, with the at least one memory 12 and the computer program code, may be further configured to cause the apparatus to perform: reporting the determined timing value together with an indication of a non-synchronization of the network to the terminal.

According to exemplary embodiments of the present invention, the at least one processor 11, with the at least one memory 12 and the computer program code, may be further configured to cause the apparatus to perform at least one of: identifying the terminal using one of a terminal identifier encoded in the received beacon signal and a transmission code used for the beacon signal transmission, and determining a processing load and initiating storage of the determined processing load as data with respect to the terminal in the network-based database.

According to exemplary embodiments of the present invention, an apparatus representing the terminal 20 comprises at least one processor 21, at least one memory 22 including computer program code, and at least one interface 23 configured for communication with at least another apparatus. The at least one processor 21, with the at least one memory and the computer program code, is configured to cause the apparatus 20 to perform: initiating transmission of a beacon signal of the terminal 20 towards at least one base station 10 in a coverage area of which the terminal 20 resides, and receiving a result of measurements relating to at least one of a radio path and a timing between the terminal 30 and the one or more of said base stations 10 from a base station 10 which is currently serving the terminal.

According to exemplary embodiments of the present invention, the at least one processor 21, with the at least one memory 22 and the computer program code, may be further configured to cause the apparatus to perform utilizing the received result of measurements for at least one of performing the handover, executing and/or completing the handover procedure, performing measurement and/or reporting in accordance with the measurement and/or reporting requirements, and making a reselection decision.

According to exemplary embodiments of the present invention, the at least one processor 21, with the at least one memory 22 and the computer program code, may be further configured to cause the apparatus to perform at least one of receiving a calculated uplink timing between the terminal and one of said base stations together with an indication of a synchronization of the network from the base station currently serving the terminal, and applying the received uplink timing, and receiving a timing value of a beacon signal receipt at one of said base stations together with an indication of a non-synchronization of the network from the base station currently serving the terminal, calculating an uplink timing between the terminal and said one of said base stations based on the received timing value and a downlink timing difference between said one of said base stations and the base station currently serving the terminal, and applying the calculated uplink timing.

According to exemplary embodiments of the present invention, the at least one processor 21, with the at least one memory 22 and the computer program code, is further configured to cause the apparatus to perform providing terminal identification by one of encoding a terminal identifier in the beacon signal and using a transmission code for the beacon signal transmission.

According to exemplarily embodiments of the present invention, the processor 11 or 21, the memory 12 or 22 and the interface 13 or 23 can be implemented as individual modules, chipsets or the like, or one or more of them can be implemented as a common module, chipset or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for cellular radio path measurement and reporting. Such measures may exemplarily comprise, by a terminal, initiating transmission of a beacon signal of the terminal towards base stations in a coverage area of which the terminal resides, and, by a base station, monitoring transmission of the beacon signal from the terminal, measuring characteristics of a radio path towards the terminal based on a received beacon signal from the terminal, determining a timing value of the received beacon signal from the terminal, and initiating storage of the measured characteristics and the determined timing value as data with respect to the terminal in a network-based database being common for base stations in a coverage area of which the terminal resides.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

List Of Acronyms And Abbreviations
CDMA Code Division Multiple Access
C-RNTI Cell Radio Network Temporary Identifier
DL Downlink
eNB evolved NodeB
LTE Long Term Evolution
RNC Radio Network Controller
RNTI Radio Network Temporary Identifier
SRS Sounding Reference Signal
TA Timing Advance
UE User Equipment
UL Uplink

What is claimed is:

1. A method comprising
monitoring transmission of a beacon signal from a terminal,
measuring characteristics of a radio path towards the terminal based on a received beacon signal from the terminal,
determining a timing value of the received beacon signal from the terminal,
initiating storage of the measured characteristics and the determined timing value as data with respect to the terminal in a network-based database being common for base stations in a coverage area of which the terminal resides,
reading a determined timing value with respect to the terminal for one of said base stations from the network-based database,
calculating an uplink timing between the terminal and said one of said base stations based on the read timing value and a downlink timing difference between said one of said base stations and a base station currently serving the terminal, and reporting the calculated uplink timing together with an indication of a synchronization of the network to the terminal.

2. The method according to claim 1, further comprising
reading at least one of the stored data with respect to the terminal for one or more of said base stations from the network-based database, and
utilizing the reading result for at least one of making a handover decision for the terminal, initiating and/or executing a handover procedure for the terminal, controlling measurement and/or reporting requirements for the terminal, reporting the reading results to the terminal, and adjusting the reading results to be reported to the terminal.

3. The method according to claim 1, further comprising
reporting the determined timing value together with an indication of a non-synchronization of the network to the terminal.

4. The method according to claim 1, further comprising at least one of
identifying the terminal using one of a terminal identifier encoded in the received beacon signal and a transmission code used for the beacon signal transmission, and
determining a processing load and initiating storage of the determined processing load as data with respect to the terminal in the network-based database.

5. The method according to claim 1, wherein at least one of the following applies:
the beacon signal comprises one of a sounding reference symbol and a transmission burst in a dedicated random access channel, and
the method is operable at or by a base station of a cellular communication system, wherein the storage in the network-based database is initiated with respect to the base station.

6. An apparatus comprising
at least one processor,
at least one memory including computer program code, and
at least one interface configured for communication with at least another apparatus,
the at least one processor, with the at least one memory and the computer program code, being configured to cause the apparatus to perform:
monitoring transmission of a beacon signal from a terminal,
measuring characteristics of a radio path towards the terminal based on a received beacon signal from the terminal,
determining a timing value of the received beacon signal from the terminal,
initiating storage of the measured characteristics and the determined timing value as data with respect to the terminal in a network-based database being common for base stations in a coverage area of which the terminal resides,
reading a determined timing value with respect to the terminal for one of said base stations from the network-based database,
calculating an uplink timing between the terminal and said one of said base stations based on the read timing value and a downlink timing difference between said one of said base stations and a base station currently serving the terminal and
reporting the calculated uplink timing together with an indication of a synchronization of the network to the terminal.

7. The apparatus according to claim 6, the at least one processor, with the at least one memory and the computer program code, being further configured to cause the apparatus to perform:
reading at least one of the stored data with respect to the terminal for one or more of said base stations from the network-based database, and
utilizing the reading result for at least one of making a handover decision for the terminal, initiating and/or executing a handover procedure for the terminal , controlling measurement and/or reporting requirements for the terminal, reporting the reading results to the terminal, and adjusting the reading results to be reported to the terminal.

8. The apparatus according to claim 6, the at least one processor, with the at least one memory and the computer program code, being further configured to cause the apparatus to perform:
reporting the determined timing value together with an indication of a non-synchronization of the network to the terminal.

9. The apparatus according to claim 6, the at least one processor, with the at least one memory and the computer program code, being further configured to cause the apparatus to perform at least one of:
identifying the terminal using one of a terminal identifier encoded in the received beacon signal and a transmission code used for the beacon signal transmission, and
determining a processing load and initiating storage of the determined processing load as data with respect to the terminal in the network-based database.

10. The apparatus according to claim 6, wherein at least one of the following applies:
the beacon signal comprises one of a sounding reference symbol and a transmission burst in a dedicated random access channel, and
the apparatus is operable as or at a base station of a cellular communication system, wherein the at least one processor, with the at least one memory and the computer program code, is further configured to cause the apparatus to perform initiating the storage in the network-based database with respect to the base station.

11. A non-transitory computer-readable memory having stored thereon computer program code which, when run on a processor of a network base station, is configured to cause the network base station to at least:
monitor transmission of a beacon signal from a terminal,
measure characteristics of a radio path towards the terminal based on a received beacon signal from the terminal,
determine a timing value of the received beacon signal from the terminal,
initiate storage of the measured characteristics and the determined timing value as data with respect to the terminal in a network-based database being common for base stations in a coverage area of which the terminal resides,
read a determined timing value with respect to the terminal for one of said base stations from the network-based database,
calculate an uplink dining between the terminal and said one of said base stations based on the read timing value and a downlink timing difference between said one of said base stations and a base station currently serving the terminal, and
report the calculated uplink timing together with an indication of a synchronization of the network to the terminal.

12. The non-transitory computer-readable memory according to claim 11, wherein the computer program code is further configured to cause the network base station to at least:
- read at least one of the stored data with respect to the terminal for one or more of said base stations from the network-based database, and
- utilize the reading result for at least one of making a handover decision for the terminal, initiating and/or executing a handover procedure for the terminal, controlling measurement and/or reporting requirements for the terminal, reporting the reading results to the terminal, and adjusting the reading results to be reported to the terminal.

13. The non-transitory computer-readable memory according to claim 11, wherein the computer program code is further configured to cause the network base station to at least:
- report the determined timing value together with an indication of a non-synchronization of the network to the terminal.

14. The non-transitory computer-readable memory according to claim 11, wherein the computer program code is further configured to cause the network base station to at least:
- identify the terminal using one of a terminal identifier encoded in the received beacon signal and a transmission code used for the beacon signal transmission, and
- determine a processing load and initiating storage of the determined processing load as data with respect to the terminal in the network-based database.

15. The non-transitory computer-readable memory according to claim 11, wherein at least one of the following applies:
- the beacon signal comprises one of a sounding reference symbol and a transmission burst in a dedicated random access channel, and
- the code is operable at or by a base station of a cellular communication system, wherein the storage in the network-based database is initiated with respect to the base station.

* * * * *

UNITED STATES PATENT AND TRADEMARK OFFICE
CERTIFICATE OF CORRECTION

PATENT NO. : 8,774,847 B2
APPLICATION NO. : 13/191861
DATED : July 8, 2014
INVENTOR(S) : Henri Jani Ilari Virta et al.

Page 1 of 1

It is certified that error appears in the above-identified patent and that said Letters Patent is hereby corrected as shown below:

In the Claims

Claim 11, column 16, line 60: Replace "an uplink dining between the terminal" with --an uplink timing between the terminal--.

Signed and Sealed this
Twenty-first Day of October, 2014

Michelle K. Lee
*Deputy Director of the United States Patent and Trademark Office*